United States Patent [19]

Gunschmann et al.

[11] 4,170,787

[45] Oct. 9, 1979

[54] TAPE RECORDING/REPRODUCING APPARATUS, PARTICULARLY FOR OPERATION WITH VIDEO TAPE CASSETTES

[75] Inventors: Peter Gunschmann, Darmstadt; Heinrich Rossmann; Theo Wolf, both of Rossdorf; Dieter Gause, Weiterstadt, all of Fed. Rep. of Germany

[73] Assignee: Robert Bosch GmbH, Stuttgart, Fed. Rep. of Germany

[21] Appl. No.: 890,417

[22] Filed: Mar. 27, 1978

[30] Foreign Application Priority Data

Mar. 26, 1977 [DE] Fed. Rep. of Germany ....... 2713524

[51] Int. Cl.² ................. G11B 15/66; G11B 15/18; G11B 23/04
[52] U.S. Cl. ........................... 360/95; 360/85; 360/130.23
[58] Field of Search ............. 360/95, 85, 132, 96; 242/197–200

[56] References Cited

U.S. PATENT DOCUMENTS

| | | | |
|---|---|---|---|
| 3,661,344 | 5/1972 | Nakamura et al. | 360/85 |
| 3,673,348 | 6/1972 | Larkin et al. | 360/85 |
| 3,674,942 | 7/1972 | Sugaya et al. | 360/85 |
| 3,688,059 | 8/1972 | Miura et al. | 360/85 |
| 3,962,727 | 6/1976 | Kamimura et al. | 360/85 |
| 4,008,489 | 2/1977 | Gilsdorf et al. | 360/85 |
| 4,015,292 | 3/1977 | Kirn | 360/95 |

*Primary Examiner*—Alfred H. Eddleman
*Attorney, Agent, or Firm*—Frishauf, Holtz, Goodman & Woodward

[57] ABSTRACT

The apparatus has a pair of guide rollers which are located to guide the tape in a direct, straight-line path between the guide rollers and, additionally, further guide rollers which are movable to engage behind the tape in the straight-line path and, when moved, wrap the tape around a record/reproduce head. The additional guide roller is movable in an essentially straight-line path, the roller, when in the position in which the tape is placed around the record/reproduce head, being the one furthest away from the cassette, when the cassette is inserted in the apparatus. Essentially simultaneously with movement of the aforementioned guide roller, other guide rollers are likewise moved to engage the tape with a drive capstan, and to additionally positively place the tape around a record/reproduce cylinder for spiral passage thereover. The other rollers operate on curved paths, the arrangement providing for timed interrelation of the stationary and movable guide elements in their respective paths in space.

15 Claims, 9 Drawing Figures

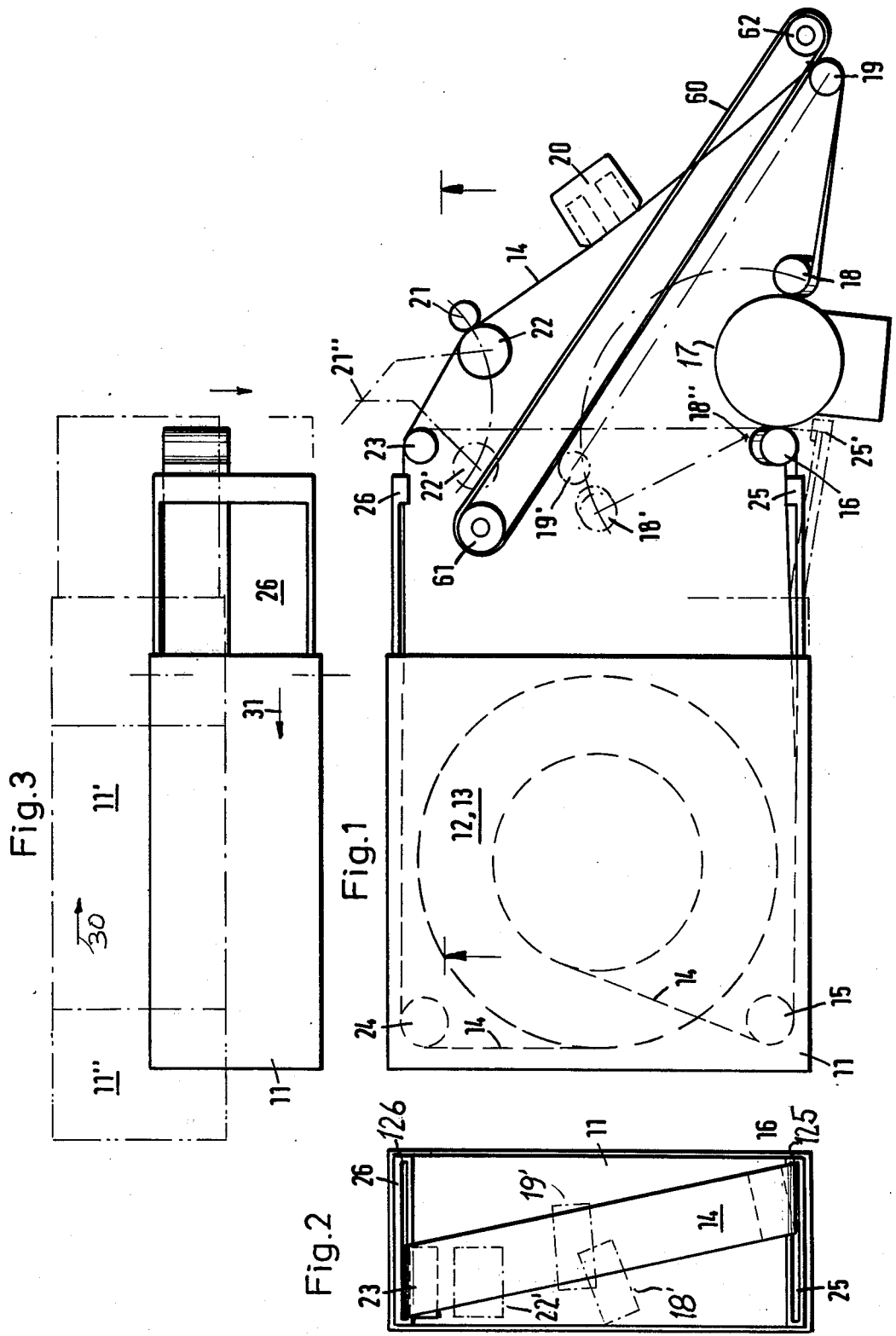

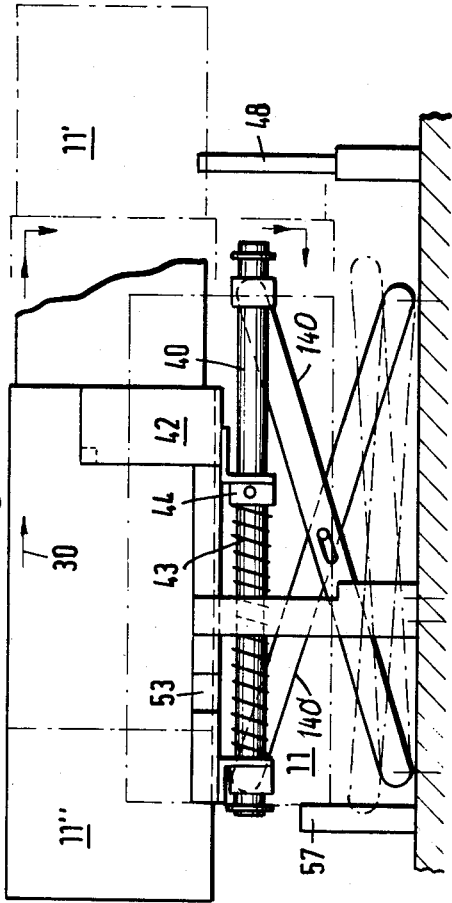
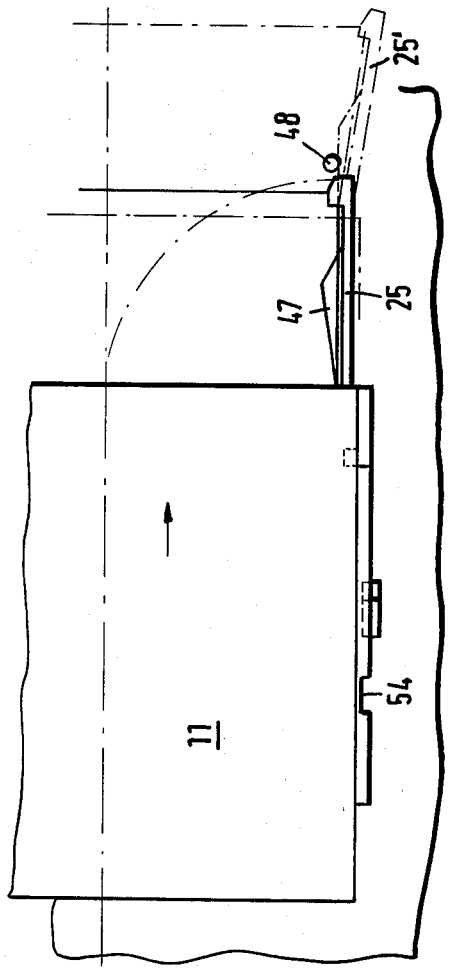
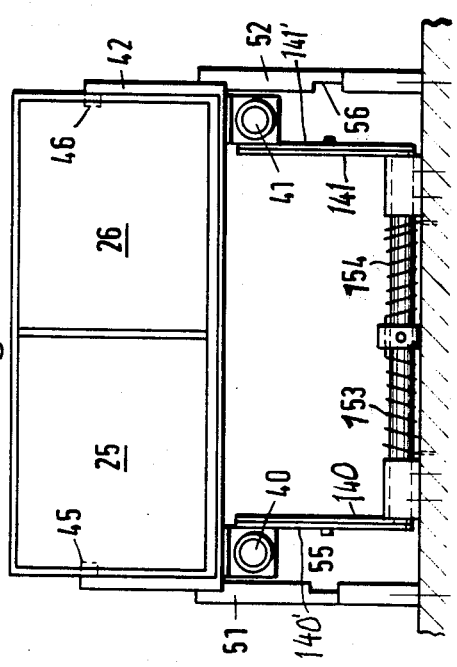

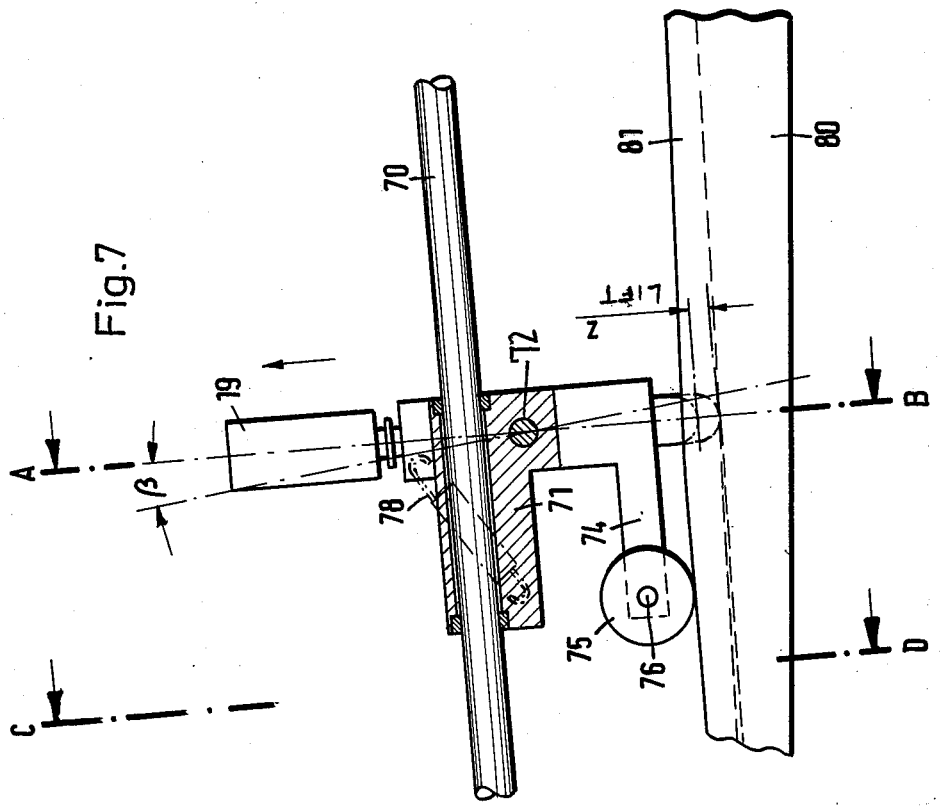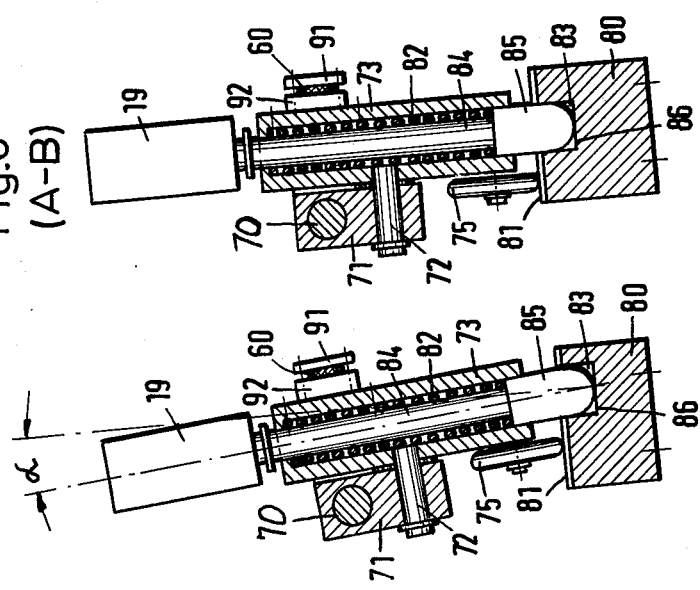

TAPE RECORDING/REPRODUCING APPARATUS, PARTICULARLY FOR OPERATION WITH VIDEO TAPE CASSETTES

The present invention relates to a tape recording/reproducing apparatus, and more particularly to such apparatus adapted to have a tape cassette inserted therein, the tape being wide—for example about 1 inch—and adapted for inclined track video tape recording/reproducing.

BACKGROUND AND PRIOR ART

Tape recording/reproducing apparatus adapted for cooperation with cassettes in which the tape is retained are well known. Various types of apparatus can be distinguished; in one, a tape is wound on a spool is removed manually from the spool and guided by an operator through a tape path to the hub of a take-up spool. It is then attached to the hub and, during operation, the tape will run from the pay-out to the take-up spool.

In another apparatus, the tape is located on a spool positioned in a cassette, and is guided in a path from a first spool to a second spool. The cassette-type recording/reproducing apparatus has the advantage of easy handling and compact construction, while additionally protecting the tape. Originally it was proposed to use cassette-type apparatus essentially in connection with consumer electronics and for popular use, particularly for home operation. Cassette recorders are, however, increasingly used also in professional and semi-professional applications. This requires an apparatus which is small, lightweight, and in which the tape can readily be interchanged against another tape in another cassette. This interchange should be rapid and simple. Various types of apparatus are known, for example apparatus described in German Published Patent Application DE-AS No. 21 66 369. After insertion of a cassette, the tape is automatically guided about a scanning device and about further scanning and guide elements. The construction shown therein, while suitable, is however comparatively space-consuming and not readily adapted for small and lightweight apparatus.

THE INVENTION

It is an object to provide a tape recorder/reproducer apparatus, particularly for the wide tape customary in video tape recording, which is small and simple to thread. Additionally, the overall size of the apparatus should, essentially, be determined by the dimensions of the cassette itself. As few movable elements as possible should be used to simplify the overall construction and to prevent malfunction.

Briefly, the tape is moved from a path in which it is guided in a straight line between two guide rollers to an operating path in which it is placed around a record/reproduce element, such as a cylinder, by a movable tape guide roller which is movable in an essentially straight-line path. The tape guide roller is so positioned that upon insertion of the tape it is located behind the tape and, when placing the tape in operating position, engages from behind the tape and wraps the tape around the record/reproduce element. Other guide rollers may be provided, movable for example in curved paths. The operation of the various elements can be spring-controlled upon insertion of the cassette and movement of the cassette in a given insertion path.

The construction can be so carried out that the loop formed by the tape as it is placed around a cylindrical record/reproduce head, in a spiral path, is not subjected to unusual non-symmetrical or unilateral stressing, thereby preventing permanent deformation of the tape.

Drawings, illustrating a preferred example:

FIG. 1 is a highly schematic front view of the apparatus, with a cassette inserted therein, in which the paths of movement of movable elements are indicated in chain-dotted lines;

FIG. 2 shows the external path of tape, with the cassette doors open, if the various rollers of FIG. 1 are placed in the chain-dotted position;

FIG. 3 is a schematic illustration of various positions of a cassette with respect to the apparatus;

FIG. 4 is a side view of the arrangement to guide the cassette within the apparatus through various positions;

FIG. 5 is a front view of the apparatus of FIG. 4;

FIG. 6 is a top view of the apparatus of FIG. 4;

FIG. 7 is a schematic side view of a guide arrangement to guide the path of the tape guide roller, with 3 degrees of freedom of the axis of the shaft thereof;

FIG. 8 is a cross-sectional view along lines A-B of FIG. 7, and illustrating adjustment of height; and FIG. 9 is a cross-sectional view taken along line C-D, with the guide roller carriage in a position intersecting the lines C-D, as illustrated in connections with lines A—B in FIG. 7.

A cassette 11 (FIG. 1) has two spools 12, 13 located above each other. The magnetic tape 14 is guided from the lower spool 13 over a guide roller 15 located in the cassette, to a deflection roller 16 located in the apparatus, from roller 16 in a spiral path about a scanning cylinder 17, then over a further roller 18 to a third deflection roller 19. The tape is then guided past a fixed audio reproducing scanning arrangement 20, located in fixed position on the apparatus, past a drive capstan 21 against which the tape is pressed by a pinch roller 22, to a further deflection roller 23 located in the apparatus and then over a deflection roller 24 located in the cassette to the upper tape reel 12. In FIG. 1, the rollers 16, 18, 19, when in full-line position, illustrate the position of the rollers when the tape is in engagement with the scanning cylinder 17. This cylinder is fixed and has retained therein a rotating scanning head containing, for example, two diametrically oppositely located transducers. The scanning head arrangement 17, as such, is known, and need not be described in detail.

After insertion of the cassette, roller 18 is placed in the position 18'; roller 19 in the position 19'; and roller 22 in the position 22'. As seen in FIG. 1, the rollers 18, 19, 22 are thus within the loop formed by the deflection rollers 18, 16, 23, 24 from which the rollers, upon movement to the solid-line positions, will then move the tape to wrap around the scanning cylinder 17 and to pass the transducer head 20, that is, place the tape in an operating path.

FIG. 2 illustrates the relationship after insertion of the cassette from the front. The cassette has doors 25, 26. The doors 25, 26 of the cassette are open, and the tape extends from a guide path behind door 25 upon partial looping over the roller 16 diagonally to the roller 23, and from that point on to a guide slot within the door 26. The path of the tape within the cassette is influenced by the tape path outside thereof only insofar as placing the tape between the roller 15 and the deflection roller 16 into a twisted path. This torsion or twist path, or torsion strip, for the tape can be accommodated without damaging the tape along the edges. It permits placing the tape without stressing the edges from a horizontal position to the diagonal position between the rollers 16, 23. The roller 23, as shown in FIG. 1, has an axis of rotation which is perpendicular to the width of the tape. As shown in the drawing, this may lead to increased stress on the tape 14. In actual practice it has been shown, however, that the ordinary tension of the tape within the cassette is insufficient to damage the tape, and that any stresses which may occur upon insertion of the tape or insertion of the cassette will not result in permanent deformation of the tape 14.

Upon insertion, cassette 11 will be moved through various positions. FIG. 3 illustrates the respective positions of the cassette upon insertion. First, the cassette will be moved from the position 11'', shown in double chain-dotted lines, in the direction of the arrow 30 into the position 11''', shown in single chain-dotted line (compare also FIG. 4). This insertion is controlled manually by the operator. During this insertion two fixed projections (not shown) on the apparatus engage suitable matching projections located on the doors 25, 26. This opens the doors and moves them from their closed position, in which they close off the cassette (FIG. 5), into the open position shown in FIG. 1. The door 25 is formed with an additional cam track 47 to be moved into the position 25' (FIG. 1, FIG. 6) which involves an opening movement greater than 90°. This larger movement is necessary to permit the tape guided over the forward edge of the cassette door 25 to slide over the roller 16 when the cassette is lowered from the position 11' (FIG. 3). After the cassette has reached the position 11' (FIGS. 3, 4), it is depressed and returned up to an abutment, as will be explained below, in the direction of the arrow 31 (FIG. 3), in which the two cassette doors 25, 26 will have the position shown in solid lines in FIG. 1. The tape now extends in a straight line from the deflection roller 16 to the deflection roller 23, as shown in broken line in FIG. 1.

The details of the insertion step are best seen in connection with FIGS. 4 to 6, in which the positions of the cassette have been labelled similarly to FIG. 3. Two parallel guide rods 40, 41 extend longitudinally and support a U-shaped frame forming a cassette holder. The U-shaped frame is longitudinallly movable counter the force of two springs, one on each guide rod 40, 41. Only one such spring, spring 43, is shown, surrounding rod 40. The rods 40, 41 are held in an upwardly extended position by scissor links 140, 140'; 141, 141'. The links themselves are held upwardly erected by spiral springs 153, 154, FIG. 5. Springs 153, 154 are positioned around a transverse shaft; the shaft as well as the springs 153, 154 have been omitted from the showings in FIGS. 4 and 6 for simplicity of the drawing. The other link, not connected by the springs, is suitably guided on a flat support, for example in a groove, and preferably connecting rods connect respectively oppositely located links 140', 141' or 140, 141, as the case may be.

Two abutment rings, of which only one is shown at 44, are located on the respective guide rods 40, 41. Upon insertion of a cassette 11 into the holder 42, and movement thereof in the direction of the arrow 30 (FIG. 4), projections 45, 46 located on the U-shaped cassette holder 42 engage corresponding projections on the doors 25, 26 of the cassette and provide for opening movement over a vertical, outer axis of rotation. This movement also stresses the spring 43. During this movement, the cam track 47 (FIG. 6) located at the lower edge of the door 25 is brought into engagement with a pin 48 formed on the base or frame of the apparatus. Engagement of cam track 47 with the pin 48 moves the door 25 to the chain-dotted position 25'. When the cassette has reached the terminal position 11' (FIG. 4), two fixed guide posts 51, 52 (FIGS. 5, 6) engage matching suitably placed notches 53, 54 formed on the cassette holder 42. This permits movement of the cassette and the cassette holder 42 counter the force of the torsion springs 153, 154 downwardly by depressing the scissor links 140, 141, 140', 141'. When the cassette has reached the lower-end position or, rather, when the cassette holder has reached bottom, it can be moved backwardly by disengagement with the posts 51, 52 by releasing the guide holder by movement through notches 55, 56 in posts 51, 52. The guide holder can be moved backwardly until it comes in engagement with the end stop 57 (FIG. 4). This partially releases the stress on the spring 43 and holds the cassette in the operating position. This last movement of the cassette, backwardly, also releases the cam track 47 from the post 48, thus holding the doors 25, 26 in approximately 90° open position, as shown in solid line with respect to door 25 in FIG. 6.

The deflection rollers 18, 19 and the pinch roller 22 are now moved into the operating position (FIG. 1). First, the deflection roller 19 is moved from the idle position 19' (FIG. 1) into the solid-line position. The deflection roller 18 which, in idle position, was located at the chain-dotted line position, is rotated in a circular arc about a center 18'' by means of a rotating link into the solid-line position. Preferably, movement is so synchronized that the roller 19 is first placed in the solid-line position, and roller 18 follows shortly thereafter. Movement can be controlled either mechanically or electrically, for example by a twist-spring released when the cassette engages abutment 57, by a rotary solenoid controlled by an engagement switch upon engagement of the cassette with stop 57, or by other suitable means, as well known. Likewise, pinch roller 22 is moved in an arc about a center 21'' by a bent link, as shown in chain-dotted lines, likewise, for example, by mechanical or electrical means.

The deflection roller 19 is secured to a gear belt 60, driven from a drive roller 61 and held tensioned by a tension roller 62. The deflection roller 19 is connected to the gear belt 60 as best seen in connection with FIGS. 7 to 9. The axes of rotation about which the rollers 18 and 22 operate and having as their outer locations 18'', 21'' extend perpendicularly from the plane of the drawing. Thus, the deflection roller 18 upon transition from the position shown at 18' into the position shown at 18 is not lifted or changed. Likewise, pinch roller 22 moves in a plane parallel to the sheet of the drawing, and preferably essentially horizontally, that is, parallel, for example, to an edge of the cassette. The pinch roller 22 likewise is moved after the roller 19 is changed in position from the chain-dotted to solid-line position. Thus, the height of the tape guide is not changed upon movement of the rollers 22, 18 to the solid-line position, and the tape is guided without error or deflection over the head 17. There is no height error in the tape path. The tape, which is guided in a straight-line path between the rollers 16 and 23 (FIG. 2) is held diagonally with respect to the opening in the cassette. The entire difference in height between the rollers 16, 23, with respect to the width thereof, is taken up in the spiral path about the transducer cylinder 17 when the tape is placed in operating position, so that the difference in level between the rollers 16, 23 is assumed by the difference in level between the rollers 16-18 when the tape 14 is in operating position. The roller 19 which, when in the position 19', is placed at a level about half-way across the height of the cassette, and thus in a position in which the tape 14 is placed when in idle or storage position. Upon changing to the solid-line position, it must be shifted axially with respect to the axis of the transducer 17 to such an extent that no level change—with respect to the width of the tape—will occur between the rollers 18, 19, 21, 23, 24. This means that, consequently, the path for the roller must be inclined to change its relative level or lateral (with respect to the width of the tape) position, that is, to provide for a transverse shifting of the roller. As noted above, the deflection roller 23 has an axis which extends perpendicularly to the plane of the drawing of FIG. 1. The upper edge of the tape is subjected to somewhat higher stretching than the lower edge when the tape is in the cassette. When the roller 19 is introduced into the tape loop, then it is of advantage that the lower edge of the tape precedes the other edge slightly in order to compensate previous non-uniform stretching effects. Simultaneously, the roller 19 which engages the tape in a somewhat inclined position, corresponding roughly to the lateral offset angle of the magnetic tape between rollers 16 and 23 should, when moved to the solid-line position, tip about its axis during this change in position so that, when in solid-line position, the axis of the roller 19 will also extend perpendicularly to the plane of the drawing as seen in FIG. 1. Thus, the entire lateral shift—with respect to FIG. 2—of the tape between the roller 16 and the roller 23 will be taken up in the spiral path around the tape transducer cylinder 17 when the tape is in operating position, so that the path from roller 19 to the roller 23, when the tape is in operating position, will be straight-line and parallel to the edge of the cassette 11. The difference in level between the two spools 12, 13 thus is compensated by the spiral path about the transducer head 17 when the cassette is in use. It should be noted that the swing arc of roller 22 from the position 22' is parallel to the edge of the cassette and in a plane perpendicular to the axis of its shaft; whereas the swing path of the roller 18 from the position 18' is not in a plane perpendicular to the axis of its shaft but rather in the plane perpendicular to the axis of the shaft of roller 22, or parallel thereto, thus bringing roller 18, when in the solid-line position, laterally with respect to the roller 16 (see FIG. 2).

Guidance of roller 19 (with reference to FIGS. 7-9): An essentially straight guide rod 70 carries a slider 71 thereon. The rod 70 is arranged to have an inclination which at least approximately compensates for the difference in level or lateral shift of the tape in order to compensate between the level differences of the roller 19 when in position 19' and in the solid line position. The slider 17 is universally movable about the rod 70 which, for example, is circular. The slider 17 has a transverse bore in which a shaft 72 is located which is connected to a guide sleeve 73, so that sleeve 73 can rotate about the shaft 72 (FIGS. 8, 9). The sleeve 73 carries a projection 74 (FIG. 7) at its end, the end of which has a roller 75 located thereon, rotatable about a shaft 76. A tension spring 78 is connected, respectively, to the slider 71 and to the sleeve 73 and positioned to provide a torque to the sleeve 73 to press the roller on a guide track 80, located below the rod 70. The track 80 has a curve 81 formed on the top side thereof which is so arranged that the roller 75, as it rolls on the curve 81, provides for a variable inclination with respect to the vertical of the roller 19, depending on the distance of an incremental area of the track 81 to the guide rod 70. This angle, $\beta$, is best seen in FIG. 7. The axis of roller 19 within sleeve 73 is continuously pressed against the base of a groove 83 formed in the track 81 by means of a spring 82. This axis or shaft 84 has a counter pin 85 at the end thereof for the spring 82. Pin 85 is formed with a rounded end 86 which fits into the groove 83 so that it can tilt laterally and slide therein, without pinching or gripping.

The base of the groove 83 does not necessarily follow the height of the track 81 so that, as the slider 71 slides along rod 70, a different height of the guide roller 19 will also result. The roller 19 thus can be lifted by dimension z (FIGS. 7) depending on the depth of the groove, as indicated by the chain-dotted dimension z. The groove 83 is not central within the track 80 throughout its length and does extend in a straight line but may have different curves with lateral deviations (compare FIGS. 8, 9) so that lateral inclination of the axis of the roller 19 about an angle $\alpha$ for any position of the slider 71 on the rod 70 can be predetermined. Thus, roller 19 is adjustable in three degrees of movement—up/down in accordance with the lift z as determined by the depth of the groove 83; forward-backward tilt by an angle $\beta$ as determined by distance of the upper surface of track 81 at any incremental area from rod 70, due to the elongated projection of arm 74 with respect to the tilt axis defined by shaft 72; and laterally, by an angle $\alpha$, as seen in FIG. 9, by lateral deviation of the groove 83 with respect to the center line—compare FIGS. 8, 9. The three directions of movement, namely the change in lift z, the change in distance between the track 81 and rod 70, and the lateral deflection of groove 83, permit adjustment of the path of the roller 19 from the position 19' to the full-line position such that the tape is pulled out from the straight-line path shown in chain-dotted lines in FIG. 1 to the full-line position in FIG. 1 without placing damaging stretching forces or stresses thereon. The tape is ready for recording/reproducing when the deflection roller 18 and the pinch roller 22 are in operating position. It is not necessary for an operator to specifically thread the tape in a path from a supply reel to a take-up reel.

When removing the cassette, it is merely necessary to reverse the operation; the deflection roller 18 and the pinch roller 22 are released, and slider 71 is returned by the gear belt 60 to the position in which the roller 19 will be in the chain-dotted position 19'. Preferably, the movement of the roller 19 is the last, following quickly after release of the deflection roller 18 and the pinch roller 22. This movement can be so quick that it is readily possible to quickly replace cassettes in the apparatus.

The belt 60 is secured to the sleeve 73 by a clamp connection 91, 92—see FIGS. 8 and 9. The flexibility of the belt 60 permits deflection about the angle $\alpha$ and the angle $\beta$ (FIGS. 7, 9).

Various changes and modifications may be made within the scope of the inventive concept.

When the doors 25, 26 are closed, then the tape 14 is guided through slits 125, 126 (FIG. 2) formed in thickened end portions of the doors in a slanting path between the superposed spools. Upon opening of the doors, the tape 14 will be partly pulled away from an essentially straight line, though inclined, path between the spools to the path shown in chain dotted lines in FIG. 1, in which the door position 25' clearly shows the passage of the tape, as guided by the respective slit in the door, after the tape has been lowered (FIG. 4) and is looped about rollers 16 and 23.

FIGS. 10, 11, 12, are perspective views, respectively showing: the apparatus without the cassette inserted;

the apparatus with the cassette in the position 11 (FIG. 4), and before movement of the guide roller element 19 to the full-line position;

and a view similar to the foregoing, after movement of the guide roller 19 to the full-line position and movement of rollers 18, 22 to their full-line position.

We claim:

1. Tape recording/reproducing apparatus adapted to have a tape cassette (11) inserted therein, in which the cassette retains a record/reproducing tape (14) and two spools (12, 13), comprising
   guide roller means (16, 23) located to guide the tape in a direct path between said spools;
   tape drive means (21, 22);
   a cylindrical record/reproduce head (17) forming a tape record/reproduce means; (17);
   means engageable with the tape to move the tape into an operating path in which the tape can engage the drive means (21, 22) and the record/reproduce means (17) including
   a plurality of tape guide rollers (16, 18, 19, 23);
   a movable tape guide roller element (19) movable in an essentially straight-line path between a first position (19') within a loop formed by said straight-line path and said spools, and in which the tape bypasses the record/reproduce means, to an operating position in which the tape is in engagement with the record/reproduce means (17), said movable tape guide roller element being formed by one of said rollers (19) and comprising that one of said rollers located furthest from the cassette when the cassette is inserted in the apparatus and the tape is in the operating position;
   one of said guide rollers (18) being movable from a first position (18') within said loop to an operating position adjacent said cylindrical head (17);
   wherein the paths of movement of said guide roller element and said movable guide roller (18) interfere with each other;
   and wherein the movements of said guide rollers are sequential.

2. Apparatus according to claim 1, wherein said tape drive means include a drive capstan (21) and a pinch roller (22), said pinch roller being movable between a first position (22') and an operating position.

3. Apparatus according to claim 1, wherein said tape drive means include a drive capstan (21) and a pinch roller (22), said pinch roller being movable between a first position (22') and an operating position;
   and wherein said tape guide roller element (19) is moved from its first position (19') within the loop towards the operating position before the tape guide roller 18 moves in the portion of the path which interferes with the movement of the tape guide roller element (19) to prevent mutual interference of movement.

4. Apparatus according to claim 3, wherein the pinch roller is moved to operate in position after the tape guide roller element (19) has reached its operating position to prevent stretching of the tape and pinching thereof.

5. Apparatus according to claim 1, wherein the cassette has an essentially flat surface extending transversely to the spooling axis of the spools (12, 13) of the cassette;
   and wherein the path of movement of said tape guide roller element (19) is inclined with respect to the plane of said essentially flat surface.

6. Apparatus according to claim 1, wherein the cassette has an essentially flat surface extending transversely to the spooling axis of the spools (12, 13);
   and wherein the path of movement of the tape guide roller element (19) is changeable in two mutually perpendicular planes and inclined with respect to the plane including said essentially flat surface.

7. Apparatus according to claim 6, wherein the tape guide roller element (19) is movable in a path which has a variable level (z) with respect to a plane including said essentially flat surface.

8. Apparatus according to claim 3, further including a guide sleeve (73);
   a shaft (84) located in the guide sleeve, the tape guide roller element (19) being rotatable about the shaft;
   and a pivot axis (72) extending perpendicularly from said sleeve (73) and permitting pivoting of said sleeve about said pivot axis.

9. Apparatus according to claim 8, further including a guide rod (70);
   a slider block (71) slidable on said guide rod (70), the pivot axis (72) extending through said slider block, the axis of said pivot axis, and the center axis of said guide rod (70) extending at essentially right angles with respect to each other.

10. Apparatus according to claim 9, further including a guide track (81) located essentially parallel to said guide rod (70);
    and means (74, 75, 76, 78) engaging said slider block (71) with said guide track (81) at a position offset with respect to said pivot axis (72) to permit tipping of said sleeve (73) about said pivot axis upon change in distance between said track (81) with respect to said guide rod (70) about an angle ($\beta$) determined by said distance and the dimensions of said tipping means.

11. Apparatus according to claim 10, wherein said guide track includes a groove (83);
    and wherein the shaft (84) of the roller (19) is secured for axial movement in said block (71) and controlled by means (86) engageable in said groove and determining the axial distance of said guide roller element (19) from said block (71) in dependence on the depth of said groove.

12. Apparatus according to claim 10, wherein the track (81) is formed with a groove (83);
    said guide rod (70) being round, and means (84, 86) in lateral engagement with said sleeve (73) and in engagement with said groove to tip said guide block (71) about said guide rod upon lateral deviation or deflection of said groove (83) from alignment with the axis of the sleeve, to permit lateral tilting or tipping about an angle ($\alpha$) of the guide roller element upon lateral deflection of the groove, and forward-backward tipping about an angle ($\beta$) of said guide roller element (19) independent of said first angle upon change of distance between said track (81) and said guide rod (70).

13. Apparatus according to claim 12, wherein said guide track includes a groove (83);

and wherein the shaft (84) of the roller (19) is secured for axial movement in said block (71) and controlled by means (86) engageable in said groove and determining the axial distance of said guide roller element (19) from said block (71) in dependence on the depth of said groove.

14. Apparatus according to claim 1, wherein the apparatus includes a cassette holder (42) of at least general U-shape adapted to receive said cassette and surround said cassette at least in part;

and a scissor-holder (40, 140, 140'; 141, 141'; 153, 154) securing said holder (42) in the apparatus.

15. Apparatus according to claim 14, wherein the scissor holder includes longitudinal rods (40, 41) and spring means biassing the cassette holder (42) to a predetermined position on said rod.

* * * * *